(12) United States Patent
Younce et al.

(10) Patent No.: US 8,898,626 B2
(45) Date of Patent: Nov. 25, 2014

(54) SYSTEM AND METHOD FOR MANAGING A SOFTWARE ASSET FOR INCLUSION IN A SOFTWARE LIBRARY

(75) Inventors: Darla Renee Younce, Everett, WA (US); Jeffery T. Flenoy, Everett, WA (US); Randall Lee Feringa, Gilbert, AZ (US); Scott Faulkner, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1468 days.

(21) Appl. No.: 12/323,830

(22) Filed: Nov. 26, 2008

(65) Prior Publication Data

US 2010/0131926 A1 May 27, 2010

(51) Int. Cl.
*G06F 9/44* (2006.01)
(52) U.S. Cl.
CPC .......................................... *G06F 8/71* (2013.01)
USPC .......................................... 717/106; 717/107
(58) Field of Classification Search
None
See application file for complete search history.

(56) References Cited

U.S. PATENT DOCUMENTS

| 2005/0027495 A1 | 2/2005 | Matichuk |
| 2009/0138516 A1 | 5/2009 | Young et al. |
| 2009/0138873 A1* | 5/2009 | Beck et al. ..................... 717/173 |

* cited by examiner

*Primary Examiner* — Qamrun Nahar
(74) *Attorney, Agent, or Firm* — Armstrong Teasdale LLP

(57) ABSTRACT

A system for managing a software asset including asset files for inclusion in a library includes: (a) a receiving manager configured for receiving the asset, verifying source of the asset and reading an installer package into the asset to establish a received asset; (b) a build manager coupled with the receiving manager and configured for creating an application wrapper file for the received asset; the build manager creating folders in a folder structure and distributing the asset files among the folders to establish a distributed folder file; the build manager using the distributed folder file to create the application wrapper file; and (c) a peer review manager coupled with the build manager and effecting a peer review process with the application wrapper file to establish a reviewed application wrapper file; the peer review manager unit cooperating with the build manager to present the reviewed application wrapper file to the library.

20 Claims, 3 Drawing Sheets

SYSTEM AND METHOD FOR MANAGING A SOFTWARE ASSET FOR INCLUSION IN A SOFTWARE LIBRARY

TECHNICAL FIELD

The present disclosure is directed to managing software assets, and especially to managing software assets for inclusion in a software library provided for use by a plurality of users in a defined membership of patrons such as employees and associates of an enterprise.

BACKGROUND

Providing a collection of software assets, such as in a software library, for use in a large enterprise such as by way of example and not by way of limitation, a large enterprise or company having numerous sites arranged in a plurality of business entities may present a number of issues. Software assets may be requested by a company employee or another authorized user of the library. Existing software assets may require updating. Source of a software asset may need to be determined to assure that license agreements in place are not violated or for another reason. Other issues may arise, as may be understood by those skilled in the art of software asset administration.

It would be advantageous to have a centralized, standardized system and method for managing a software asset for inclusion in a software library or similar centralized software repository.

It would be further advantageous to have a standardized system and method for managing a software asset providing a single portal tool for supporting the life cycle of a software asset, including acquisition, updating, evaluating and other aspects of managing a software asset for an enterprise.

SUMMARY

A system for managing a software asset including a plurality of files for inclusion in a software library includes: (a) a receiving manager unit configured for receiving the asset, verifying source of the asset and reading an installer package into the asset to establish a received asset; (b) a build manager unit coupled with the receiving manager unit and configured for creating an application wrapper file for the received asset; the build manager unit creating a plurality of folders in a predetermined folder structure and distributing individual files of the plurality of files among the plurality of folders to establish a distributed folder file; the respective build manager unit using the distributed folder file to establish the application wrapper file; and (c) a peer review manager unit coupled with the build manager unit and effecting a peer review process with the application wrapper file to establish a reviewed application wrapper file; the peer review manager unit cooperating with the build manager unit to effect presenting the reviewed application wrapper file to the software library.

A method for managing a software asset for inclusion in a software library; the software asset including a plurality of files; the method includes: (a) in no particular order: (1) providing at least one receiving manager unit configured for receiving the software asset; (2) providing at least one build manager unit coupled with the at least one receiving manager unit and configured for creating an application wrapper file for the received software asset; and (3) providing at least one peer review manager unit coupled with the at least one build manager unit and configured for effecting a peer review process with an application wrapper file; (b) operating a respective receiving manager unit of the at least one receiving manager unit to verify source of the software asset; (c) operating the respective receiving manager unit to read an installer package into the software asset to establish a received software asset; (d) operating a respective build manager unit of the at least one build manager unit to create a plurality of folders in a folder structure according to a predetermined folder structure; (e) operating the respective build manager unit to distribute individual files of the plurality of files among the plurality of folders to establish a distributed folder file; (f) operating the respective build manager to use said distributed folder file to establish an application wrapper file; (g) operating a respective peer review manager unit of the at least one peer review manager unit to effect the peer review process with the application wrapper file to establish a reviewed application wrapper file; and (h) operating the respective peer review manager unit to cooperate with said build manager unit to effect presenting said reviewed application wrapper file to said software library.

It is, therefore, a feature of the present disclosure to provide a centralized; standardized system and method for managing a software asset for inclusion in a software library or similar centralized software repository.

It is a further feature of the present disclosure to provide a standardized system and method for managing a software asset providing a single portal tool for supporting the life cycle of a software asset, including acquisition, updating, evaluating and other aspects of managing a software asset for an enterprise.

Further features of the present disclosure will be apparent from the following specification and claims when considered in connection with the accompanying drawings, in which like elements are labeled using like reference numerals in the various figures, illustrating embodiments of the disclosure.

DETAILED DESCRIPTION

Figure 1:
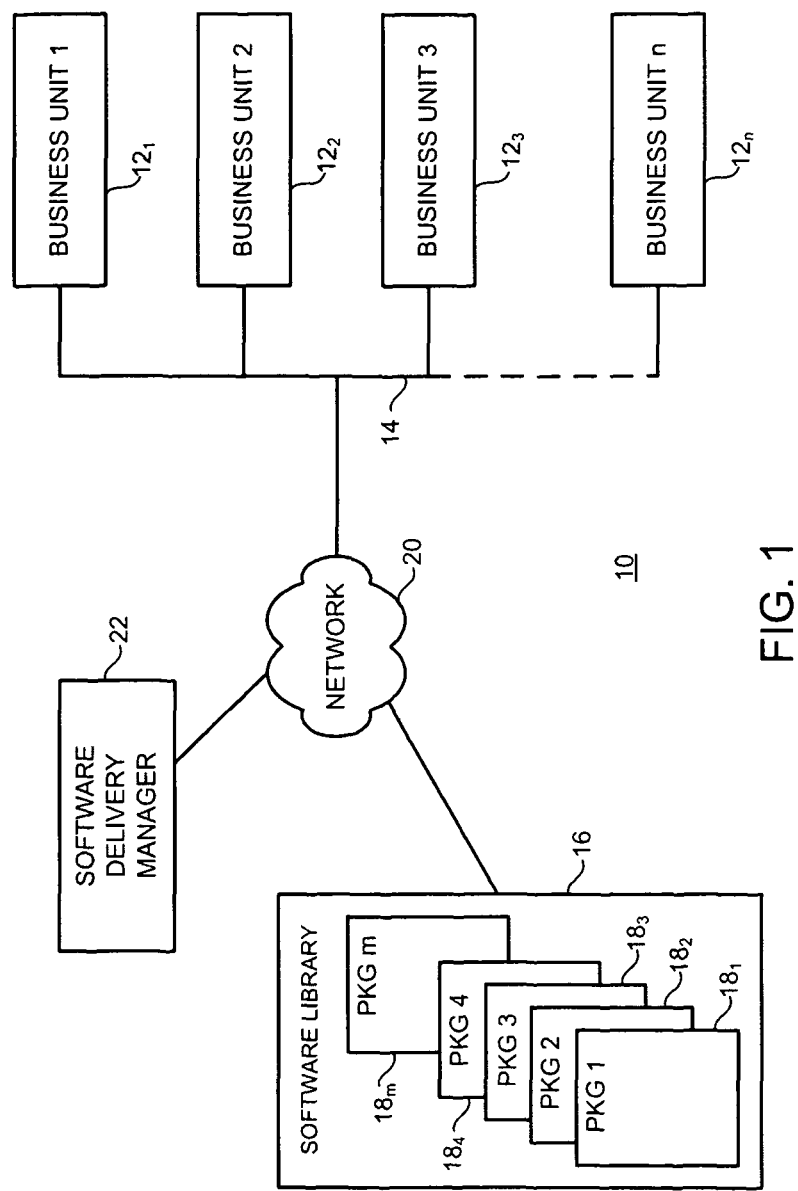
FIG. 1 is a schematic diagram of a communication system in which the present invention may be employed.

FIG. 1 is a schematic diagram of a communication system in which the present invention may be employed. In FIG. 1, a business enterprise 10 may include business units $12_1$, $12_2$, $12_3$, $12_n$ communicatingly coupled via a communication bus 14. The indicator "n" is employed to signify that there can be any number of business units in business enterprise 10. The inclusion of four business units $12_1$, $12_2$, $12_3$, $12_n$ in FIG. 1 is illustrative only and does not constitute any limitation regarding the number of business units that may be coupled for employing the present disclosure. Throughout this description, use of a reference numeral using a generic subscript herein may be taken to mean that any respective member of the plurality of elements having the same reference numeral may be regarded as included in the description. Thus, by way of example and a not by way of limitation, referring to business unit $12_n$ in describing FIG. 1 may be taken to mean that any business unit—$12_1$, $12_2$, $12_3$ or $12_n$ (FIG. 1)—may be regarded as capable of employment as described.

Business enterprise 10 may include a software library 16. Software library 16 may include a variety of software assets or packages for access by a respective business unit $12_n$. Software library 16 may include packages $18_1, 18_2, 18_3, 18_4, 18_m$. In FIG. 1, the notation "PKG" indicates "package" and may refer to a software package such as, by way of example and not by way of limitation, a software program, routine or other expression of software or programming code available for use by a business unit $12_n$. The indicator "m" is employed to signify that there can be any number of packages in software library 16. The inclusion of five packages $18_1, 18_2, 18_3, 18_4, 18_m$ in FIG. 1 is illustrative only and does not constitute any limitation regarding the number of packages that may be included in a software library 16 according to the present disclosure. Communications may be effected between software library 16 and business units $12_n$ via a communication network 20.

A system for managing a software asset for inclusion in a software library may be embodied in a software delivery manager unit 22. Software delivery manager unit 22 may be coupled with communication network 20 for effecting communications with business units $12_n$ and with software library 16.

Figure 2:
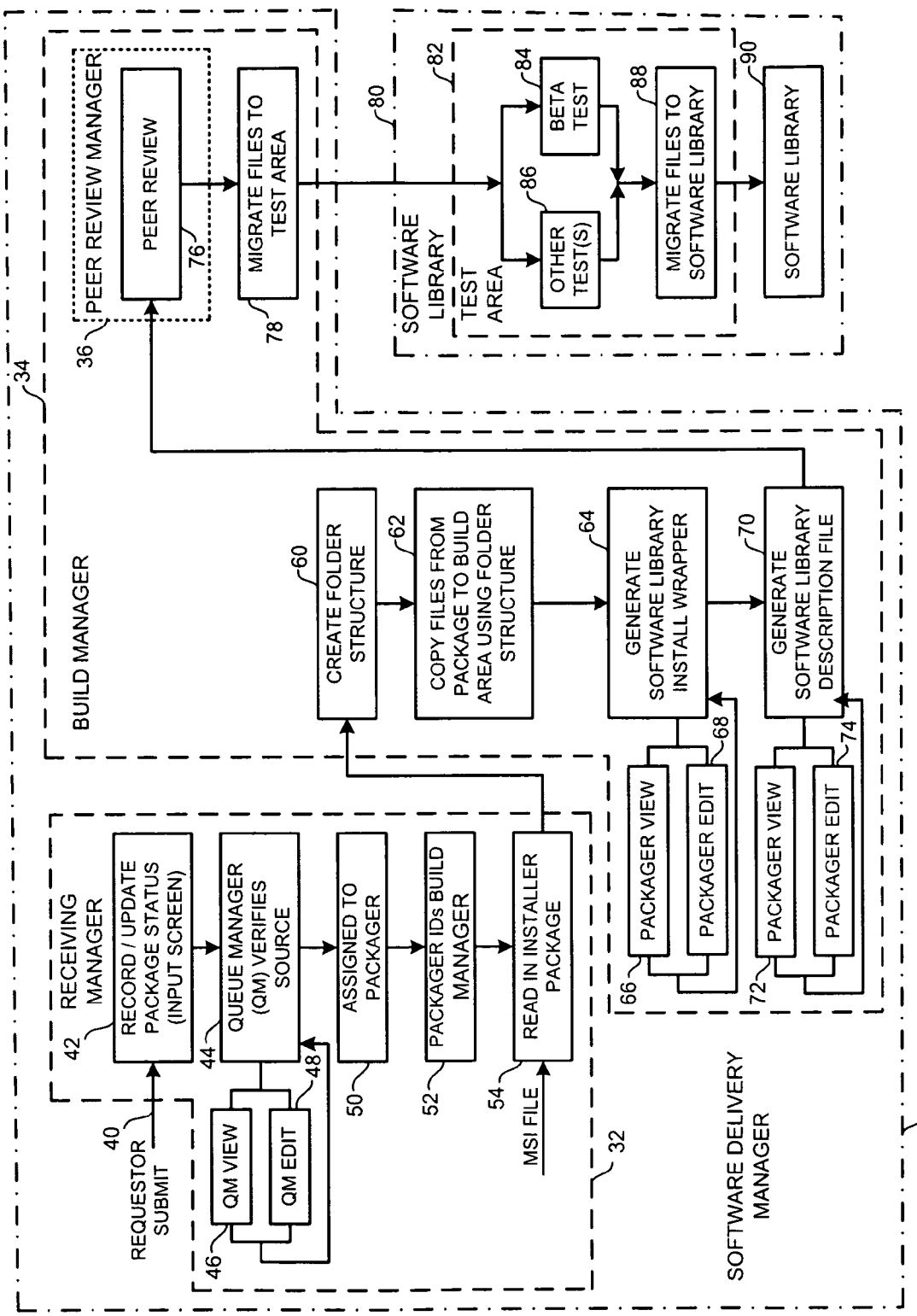
FIG. 2 is a schematic diagram of the system of the present disclosure.

FIG. 2 is a schematic diagram of the system of the present disclosure. In FIG. 2, a system 30 for managing a software asset may include a receiving manager unit 32, a build manager unit 34 and a peer review manager unit 36. Peer review manager unit 36 may be integrally included within build manager unit 34.

Receiving manager unit 32 may be coupled for receiving a request or submission from a requestor, as indicated at an input locus 40. The requestor may be, by way of example and not by way of limitation, an employee or associate of a business unit $12_n$ (FIG. 1). The submission presented by the requestor may be, by way of further example and not by way of limitation, a software package $18_m$ new to software library 16 (FIG. 1), or an update to a software package $18_m$ already present in software library 16. The submission may be effected by recording or updating (or both recording and updating) status of the submission or submitted package such as, by way of example and not by way of limitation, via an on-line input screen 42 completed by the requestor.

A queue manager 44 may verify source of the submission. In the process of effecting verifying source of the submission, queue manager 44 may view the submission (as indicated at block 46) or edit the submission (as indicated at block 48) or both view and edit the submission 46, 48.

After queue manager 44 completes verifying source of the submission, a packager 50 may be assigned for handling the submission. Packager 50 may identify (as indicated at 52) a build manager unit 34 (when there are more than one build manager unit) and packager 50 may read in an installer package such as, by way of example and not by way of limitation, a ".MSI" (Microsoft Windows Installer) file (as indicated at 54) to establish a received software asset for presenting to build manager 34.

Build manager unit 34 may create a folder structure (as indicated at 60). The folder structure may be automatically created according to a predetermined folder structure or a standard folder structure. Build manager unit 34 may copy files comprising the submission or submitted package from the submission or submitted package to the folder structure (as indicated at 62) to establish a distributed folder file. It may also be useful for build manager unit 34 to copy additional files associated with the submission or submitted package that may aid in effecting installation or operation of the submission of submitted package. Such addition files may also be included in the distributed folder in appropriate folders within the predetermined folder structure.

Build manager unit 34 may then use the distributed folder file to create a Software Library Install Wrapper file (as indicated at 64) such as, by way of example and not by way of limitation, a ".APP" wrapper file. The Software Library Install Wrapper file may be a wrapper file for use in software library 16 (FIG. 1). In the process of creating the Software Library Install Wrapper file, packager 50 may view the Software Library Install Wrapper file (as indicated at block 66) or edit the Software Library Install Wrapper file (as indicated at block 68) or both view and edit the Software Library Install Wrapper file 66, 68.

Build manager unit 34 may then create a Software Library Description file (as indicated at 70) to explain to a user of the submitted package what the application is used for. The Software Library Description file may be embodied in, by way of example and not by way of limitation, a ".RTF" (Rich Text Formatted) file. The Software Library Description file may also provide other information such as links to a HELP desk or other resource. In the process of creating the Software Library Description file, packager 50 may view the Software Library Description file (as indicated at block 72) or edit the Software Library Description file (as indicated at block 74) or both view and edit the Software Library Description file 72, 74. By generating the Software Library Install Wrapper and Software Library Description files, build manager unit 34 may have effected creation of an application wrapper for presentation to peer review manager unit 36.

Peer review manager unit 36 may effect peer review of the application wrapper (as indicated at 76). After completion of peer review, peer review manager unit 36 may cooperate with build manager unit 34 to effect presenting or migrating a reviewed application wrapper file (as indicated at 78) to a software library unit 80.

Software library unit 80 may include a test area 82 and a software library facility 90. Peer review manager unit 36 may carry out migration of the reviewed application wrapper directly to test area 82. Test area 82 may substantially always carry out a beta test process 84. If the submitted package is intended, by way of example and not by way of limitation, for company-wide or enterprise-wide use, then additional testing may be carried out with regard to the reviewed application wrapper file, indicated as other test(s) 86. After completion of testing 84, 86 as appropriate, test area 82 may present or migrate a completed application wrapper file (as indicated at 88) to software library facility 90. The completed application wrapper file may thereafter be available for use by an employee or associate of a business unit $12_n$ (FIG. 1).

Figure 3:
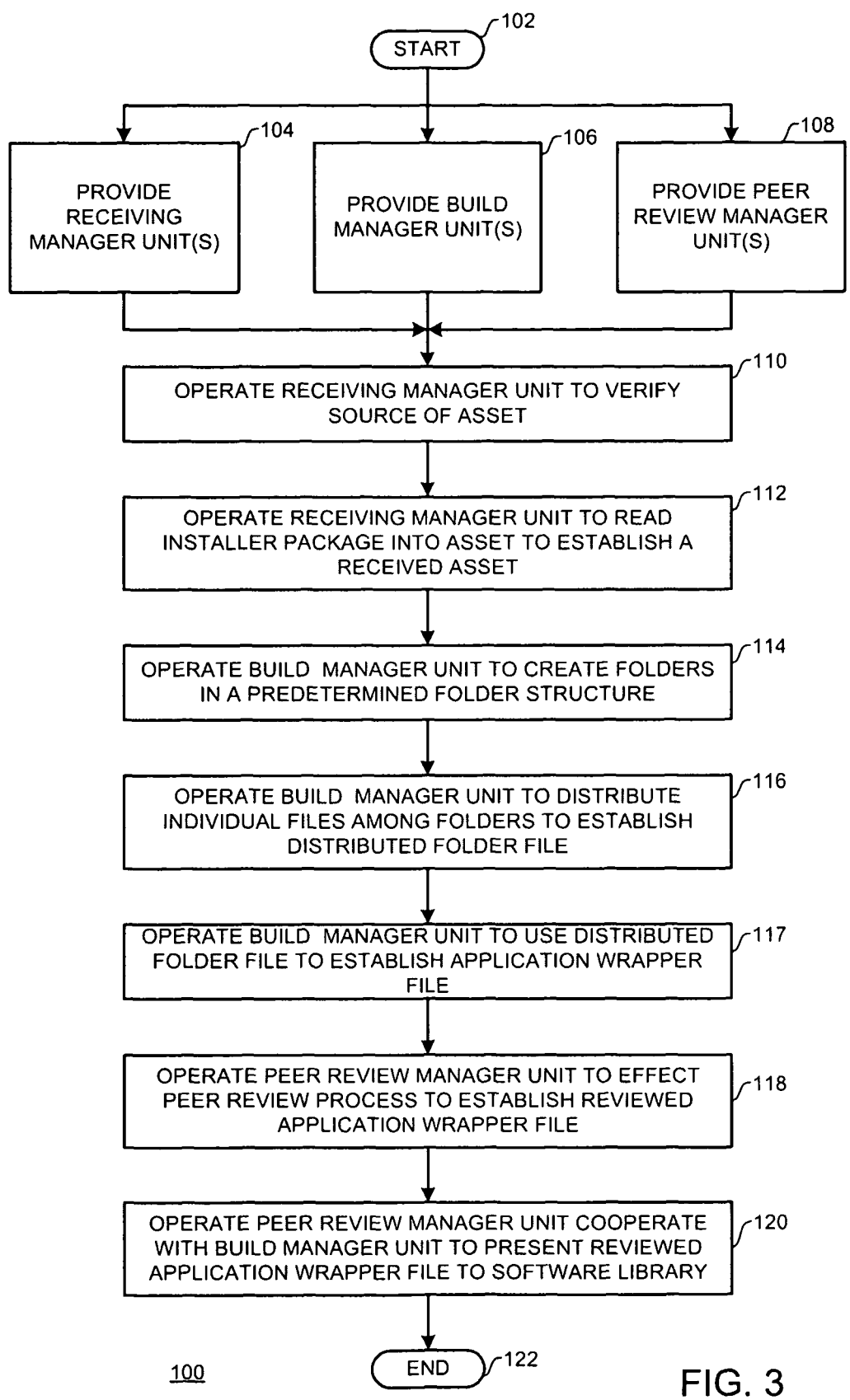
FIG. 3 is a flow diagram illustrating the method of the present disclosure.

FIG. 3 is a flow diagram illustrating the method of the present disclosure. In FIG. 3, a method 100 for managing a software asset including a plurality of files for inclusion in a software library begins at a START locus 102.

Method 100 may continue with, in no particular order: (1) providing at least one receiving manager unit configured for receiving the software asset, as indicated by a block 104; (2) providing at least one build manager unit coupled with the at least one receiving manager unit and configured for creating an application wrapper file for the received software asset, as indicated by a block 106; and (3) providing at least one peer review manager unit coupled with the at least one build manager unit and configured for effecting a peer review process with an application wrapper file, as indicated by a block 108.

Method 100 may continue with operating a respective receiving manager unit of the at least one receiving manager unit to verify source of the software asset, as indicated by a block 110.

Method 100 may continue with operating the respective receiving manager unit to read an installer package into the software asset to establish a received software asset, as indicated by a block 112.

Method 100 may continue with operating a respective build manager unit of the at least one build manager unit to create a plurality of folders in a folder structure according to a predetermined folder structure, as indicated by a block 114.

Method 100 may continue with operating the respective build manager unit to distribute individual files of the plurality of files among the plurality of folders to establish a distributed folder file, as indicated by a block 116.

Method 100 may continue with operating the respective build manager unit to use the distributed folder file to establish an application wrapper file, as indicated by a block 117.

Method 100 may continue with operating a respective peer review manager unit of the at least one peer review manager unit to effect the peer review process with the application wrapper file to establish a reviewed application wrapper file, as indicated by a block 118.

Method 100 may continue with operating the respective peer review manager unit to cooperate with the respective build manager unit to effect presenting a reviewed application wrapper file to the software library, as indicated by a block 120. Method 100 may terminate at an END locus 122.

It is to be understood that, while the detailed drawings and specific examples given describe preferred embodiments of the disclosure, they are for the purpose of illustration only, that the apparatus and method of the disclosure are not limited to the precise details and conditions disclosed and that various changes may be made therein without departing from the spirit of the disclosure which is defined by the following claims:

We claim:

1. A system for managing a software asset for inclusion in a software library; said software asset including a plurality of files; the system comprising:
   a processor;
   a communication network;
   at least one receiving manager unit configured for receiving said software asset; a respective receiving manager unit of said at least one receiving manager unit verifying source of said software asset; said respective receiving manager unit reading an installer package into said software asset to establish a received software asset;
   at least one build manager unit coupled with said at least one receiving manager unit and configured for creating an application wrapper file for said received software asset, wherein the application wrapper file includes a description file that includes a description of what the received software asset is used for; a respective build manager unit of said at least one build manager unit creating a plurality of folders in a folder structure according to a predetermined folder structure; said respective build manager unit distributing individual files of said plurality of files among said plurality of folders to establish a distributed folder file; said respective build manager unit using said distributed folder file to establish said application wrapper file; and
   at least one peer review manager unit coupled with said at least one build manager unit and configured for effecting a peer review process with said application wrapper file; a respective peer review manager unit of said at least one peer review manager unit effecting said peer review process with said application wrapper file to establish a reviewed application wrapper file; said respective peer review manager unit cooperating with said build manager unit to effect presenting said reviewed application wrapper file to said software library.

2. A system for managing a software asset for inclusion in a software library as recited in claim 1 wherein said creating a plurality of folders in a predetermined folder structure is automatically machine-effected.

3. A system for managing a software asset for inclusion in a software library as recited in claim 1 wherein said distributing individual files among said plurality of folders is automatically machine-effected.

4. A system for managing a software asset for inclusion in a software library as recited in claim 2 wherein said distributing individual files among said plurality of folders is automatically machine-effected.

5. A system for managing a software asset for inclusion in a software library as recited in claim 1 wherein said software asset is received from a submitting entity; said submitting entity being coupled with the system via said communication network.

6. A system for managing a software asset for inclusion in a software library as recited in claim 1 wherein the system is coupled with said software library via said communication network.

7. A system for managing a software asset for inclusion in a software library as in claim 4 wherein said software asset is received from a submitting entity; said submitting entity being coupled with the system via said communication network, and wherein the system is coupled with said software library via said communication network.

8. A system for managing updating or expanding a software library with at least one computer-readable file; the system comprising:
   a processor;
   a communication network;
   at least one receiving manager unit configured for receiving said at least one computer-readable file; a respective receiving manager unit of said at least one receiving manager unit verifying source of said at least one computer-readable file; said respective receiving manager unit reading an installer package into said software asset to establish a received at least one computer-readable file;
   at least one build manager unit coupled with said at least one receiving manager unit and configured for creating an application wrapper file for said received at least one computer readable file, wherein the application wrapper file includes a description file that includes a description of what the received at least one computer readable file is used for; a respective build manager unit of said at least one build manager unit creating a plurality of folders in a folder structure according to a predetermined folder structure; said respective build manager unit distributing said at least one computer readable file among said plurality of folders to establish a distributed folder file; said respective build manager unit using said distributed folder file to establish said application wrapper file; and
   at least one peer review manager unit coupled with said at least one build manager unit and configured for effecting a peer review process with said application wrapper file; a respective peer review manager unit of said at least one peer review manager unit effecting said peer review process with said application wrapper file to establish a reviewed application wrapper file; said respective peer review manager unit cooperating with said build manager unit to effect presenting said reviewed application wrapper file to said software library.

9. A system for managing updating or expanding a software library with at least one computer-readable file as recited in claim 8 wherein said creating a plurality of folders in a predetermined folder structure is automatically machine-effected.

10. A system for managing updating or expanding a software library with at least one computer-readable file as recited in claim 8 wherein said distributing said at least one computer readable file among said plurality of folders is automatically machine-effected.

11. A system for managing updating or expanding a software library with at least one computer-readable file as recited in claim 9 wherein said distributing said at least one computer-readable file among said plurality of folders is automatically machine-effected.

12. A system for managing updating or expanding a software library with at least one computer-readable file as recited in claim 8 wherein said at least one computer-readable file is received from a submitting entity; said submitting entity being coupled with the system via said communication network.

13. A system for managing updating or expanding a software library with at least one computer-readable file as recited in claim 8 wherein the system is coupled with said software library via said communication network.

14. A system for managing updating or expanding a software library with at least one computer-readable file as recited in claim 11 wherein said at least one computer-readable file is received from a submitting entity; said submitting entity being coupled with the system via said communication network, and wherein the system is coupled with said software library via said communication network.

15. A method for managing a software asset for inclusion in a software library; said software asset including a plurality of files; the method comprising:
   in no particular order:
      providing at least one receiving manager unit configured for receiving said software asset;
      providing at least one build manager unit coupled with said at least one receiving manager unit and configured for creating an application wrapper file for said received software asset; and
      providing at least one peer review manager unit coupled with said at least one build manager unit and configured for effecting a peer review process with an application wrapper file;
   operating a respective receiving manager unit of said at least one receiving manager unit to verify source of said software asset;
   operating said respective receiving manager unit to read an installer package into said software asset to establish a received software asset;
   operating a respective build manager unit of said at least one build manager unit to create a plurality of folders in a folder structure according to a predetermined folder structure;
   operating said respective build manager unit to distribute individual files of said plurality of files among said plurality of folders to establish a distributed folder file;
   operating said respective build manager unit to generate a description file that includes a description of what the received software asset is used for;
   operating said respective build manager unit to use said distributed folder file and the description file to establish said application wrapper file;
   operating a respective peer review manager unit of said at least one peer review manager unit to effect said peer review process with said application wrapper file to establish a reviewed application wrapper file; and
   operating said respective peer review manager unit to cooperate with said build manager unit to effect presenting said reviewed application wrapper file to said software library.

16. A method for managing a software asset for inclusion in a software library as recited in claim 15 wherein said creating a plurality of folders in a predetermined folder structure is automatically machine-effected.

17. A method for managing a software asset for inclusion in a software library as recited in claim 15 wherein said distributing individual files among said plurality of folders is automatically machine-effected.

18. A method for managing a software asset for inclusion in a software library as recited in claim 16 wherein said distributing individual files among said plurality of folders is automatically machine-effected.

19. A method for managing a software asset for inclusion in a software library as recited in claim 15 wherein said software asset is received from a submitting entity; said submitting entity being coupled with the system via a communication network.

20. A system for managing a software asset for inclusion in a software library as recited in claim 15 wherein the system is coupled with said software library via a communication network.

\* \* \* \* \*